United States Patent
Qiu et al.

(10) Patent No.: US 12,442,709 B2
(45) Date of Patent: Oct. 14, 2025

(54) RESET PRESSURE TESTING METHOD AND SYSTEM FOR BASEBOARD MANAGEMENT CONTROLLER

(71) Applicant: Fulian Precision Electronics (Tianjin) Co., LTD., Tianjin (CN)

(72) Inventors: Duo Qiu, Tianjin (CN); Jun-Lan Liu, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 613 days.

(21) Appl. No.: 17/824,016

(22) Filed: May 25, 2022

(65) Prior Publication Data

US 2023/0314259 A1    Oct. 5, 2023

(30) Foreign Application Priority Data

Mar. 30, 2022  (CN) .......................... 202210333836.8

(51) Int. Cl.
*G01L 27/00*    (2006.01)
(52) U.S. Cl.
CPC ................................ *G01L 27/007* (2013.01)

(58) Field of Classification Search
CPC .... G01L 27/002; G01L 27/005; G01L 27/007
See application file for complete search history.

(56) References Cited

FOREIGN PATENT DOCUMENTS

| CN | 102915258 A | * | 2/2013 |
|---|---|---|---|
| CN | 110750480 B | | 6/2021 |
| CN | 113448783 A | | 9/2021 |

* cited by examiner

*Primary Examiner* — Lam S Nguyen
(74) *Attorney, Agent, or Firm* — ScienBiziP, P.C.

(57) ABSTRACT

A reset pressure method includes sending a first signal to a complex programmable logic device (CPLD) by a BMC; sending a second signal to the BMC to reset the BMC by the CPLD when the CPLD receives the first signal; the CPLD detecting whether a third signal appears in the BMC when the BMC is reset. When the CPLD detects the third signal appearing in the BMC, the BMC is determined to have completed the reset and is operating normally. When the CPLD does not detect the third signal in the BMC, the reset pressure testing of the BMC is determined as interrupted. A reset pressure system and a non-transitory storage medium are also disclosed.

17 Claims, 5 Drawing Sheets

RESET PRESSURE TESTING METHOD AND SYSTEM FOR BASEBOARD MANAGEMENT CONTROLLER

TECHNICAL FIELD

The present disclosure relates to the technical field of server, in particular to testing baseboard management controller.

BACKGROUND

The baseboard management controller (BMC) monitors and adjusts as necessary the temperature, voltage, fan and power supply of a system to ensure that the system is in normal state. If the BMC crashes, it is necessary to reset the software of the BMC immediately by manually pressing the reset button. When the BMC is reset, it is necessary to make the BMC work again when the system it is managing is working normally again. Therefore, in order to verify whether the system is stable during an external reset of BMC, it is necessary to test the reset pressure of the BMC. Usually, in the BMC reset pressure test, it is necessary to manually press the BMC reset button thousands of times to meet the test requirements, which consumes a lot of human resources and time, and the test efficiency is very low. When the server is running, the fan of the server is very noisy. When different staff conduct tests, individual test methods will inevitably be different, which will lead to inconsistent test standards.

Therefore, improvement is desired.

DETAILED DESCRIPTION

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

It should be noted that "at least one" in the embodiment of the present disclosure refers to one or more, and multiple refers to two or more. For example, the terms "first", "second", "third", "fourth" in the description, claims and drawings of the application are used to distinguish similar objects, rather than to describe a specific order.

Figure 1:
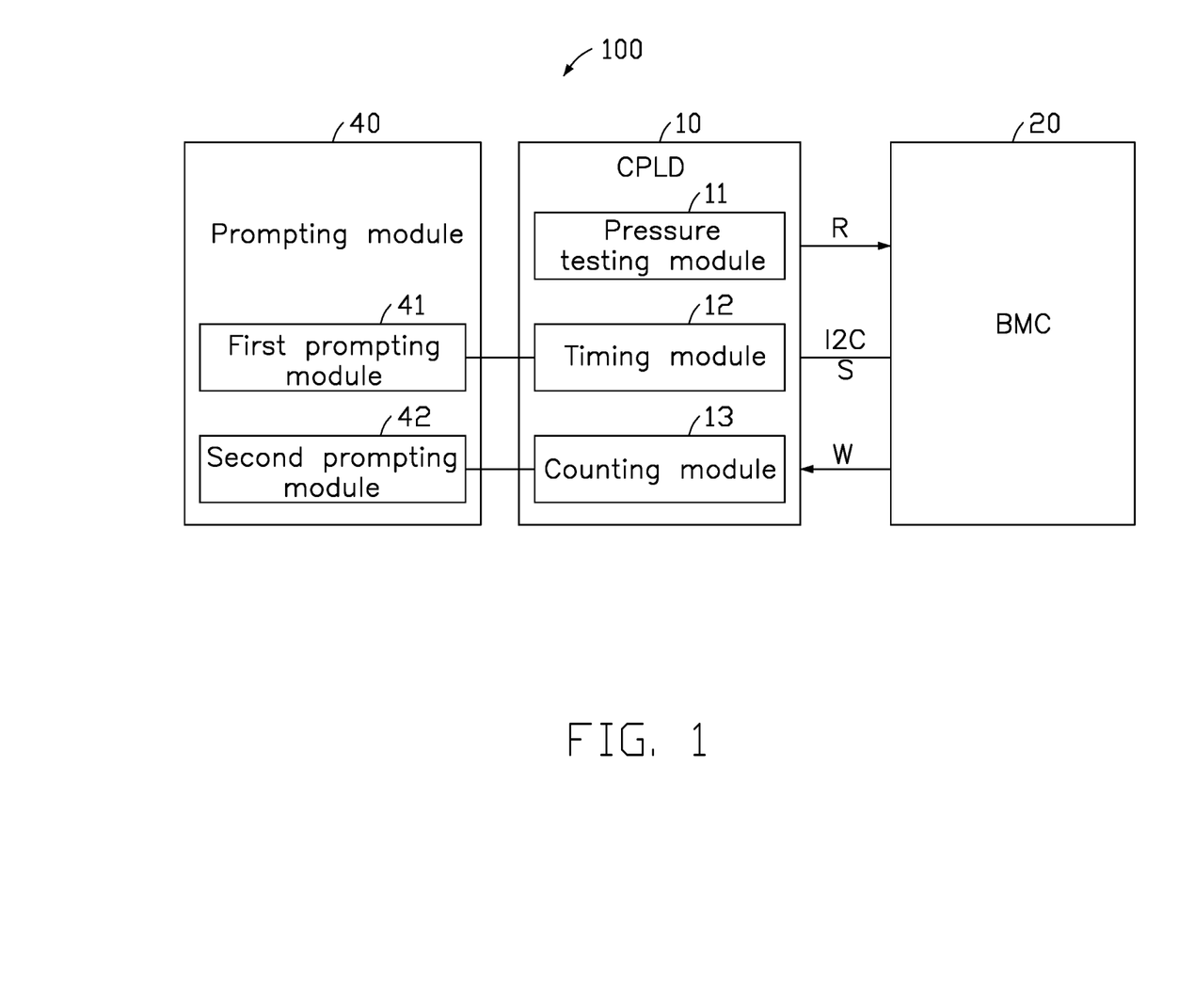
FIG. 1 is a schematic diagram of a reset pressure testing system for a baseboard management controller (BMC) according to an embodiment of the present disclosure.

FIG. 1 illustrates a reset pressure testing system 100 in accordance with an embodiment of the present disclosure.

The reset pressure testing system 100 includes a complex programmable logic device (CPLD) 10 and a baseboard management controller (BMC) 20.

The CPLD 10 includes a pressure testing module 11, a timing module 12, and a counting module 13. In the embodiment, the pressure testing module 11 may be code of the program for performing the BMC 20 reset pressure test, and then perform the reset pressure test of the BMC 20 through the CPLD 10. In the embodiment, the timing module 12 may be a timer, the counting module 13 may be a counter.

In some embodiments, when the pressure testing module 11 is set in the CPLD 10, the logic unit resources which are consumed are similar to those when the pressure testing module 11 is not set in the CPLD 10. Therefore, adding the pressure testing module 11 to the CPLD 10 costs less, makes the reset pressure test of BMC 20 more convenient, and saves the cost of human resources.

The BMC 20 is connected to the CPLD 10 through an Inter-Integrated Circuit (I2C) bus. The BMC 20 and the CPLD 10 transmit signals through the I2C bus. When the BMC 20 sends the first signal to the CPLD 10 through the I2C bus, the CPLD 10 receives the first signal and enables the pressure testing module 11, and the CPLD 10 sends the second signal to the BMC 20, so that the BMC 20 can be reset pressure tested.

In some embodiments, the first signal is the signal that controls the start of the reset pressure test of the BMC 20. The second signal is the signal that controls the BMC 20 to reset.

In some embodiments, when the BMC 20 is reset after receiving the second signal, the CPLD 10 detects whether the BMC 20 sends a third signal. When the CPLD 10 detects the third signal sent by the BMC 20 within a preset time, the test is completed. When the BMC 20 does not reset after receiving the second signal, the test is interrupted and the test ends.

In some embodiments, the third signal is the heartbeat signal of the BMC 20. When the BMC 20 is reset and operates normally, the third signal reappears in the BMC 20.

The number of the reset pressure tests of the BMC 20 and the time interval of each test are preset in I2C bus through an intelligent platform management interface (IPMI) tool.

In one embodiment, the timing module 12 may be a timer for detecting the time for processing the reset pressure test of the BMC 20. The counting module 13 may be a counter for detecting the number of the resets of the BMC 20 during the reset pressure test of the BMC 20.

In one embodiment, the reset pressure testing system 100 further includes a prompting module 40, the prompting module 40 includes a first prompting module 41 and a second prompting module 42. The first prompting module 41 and the second prompting module 42 may be a light-emitting diodes (LEDs). The first prompting module 41 is used to display the number of the resets of the BMC 20 during the reset pressure test of the BMC 20. The second prompting module 42 is used to display the state of the reset pressure test of the BMC 20.

In some embodiments, when the reset pressure test of the BMC 20 is interrupted, the second prompting module 42 is in the first state. When the reset pressure test of the BMC 20 is normal, the second prompting module 42 is in the second state. For example, the second prompting module 42 is a LED. When the reset pressure test of the BMC 20 is interrupted, the LED lights up. When the reset pressure test of the BMC 20 is normal, the LED will not light up.

Figure 2:
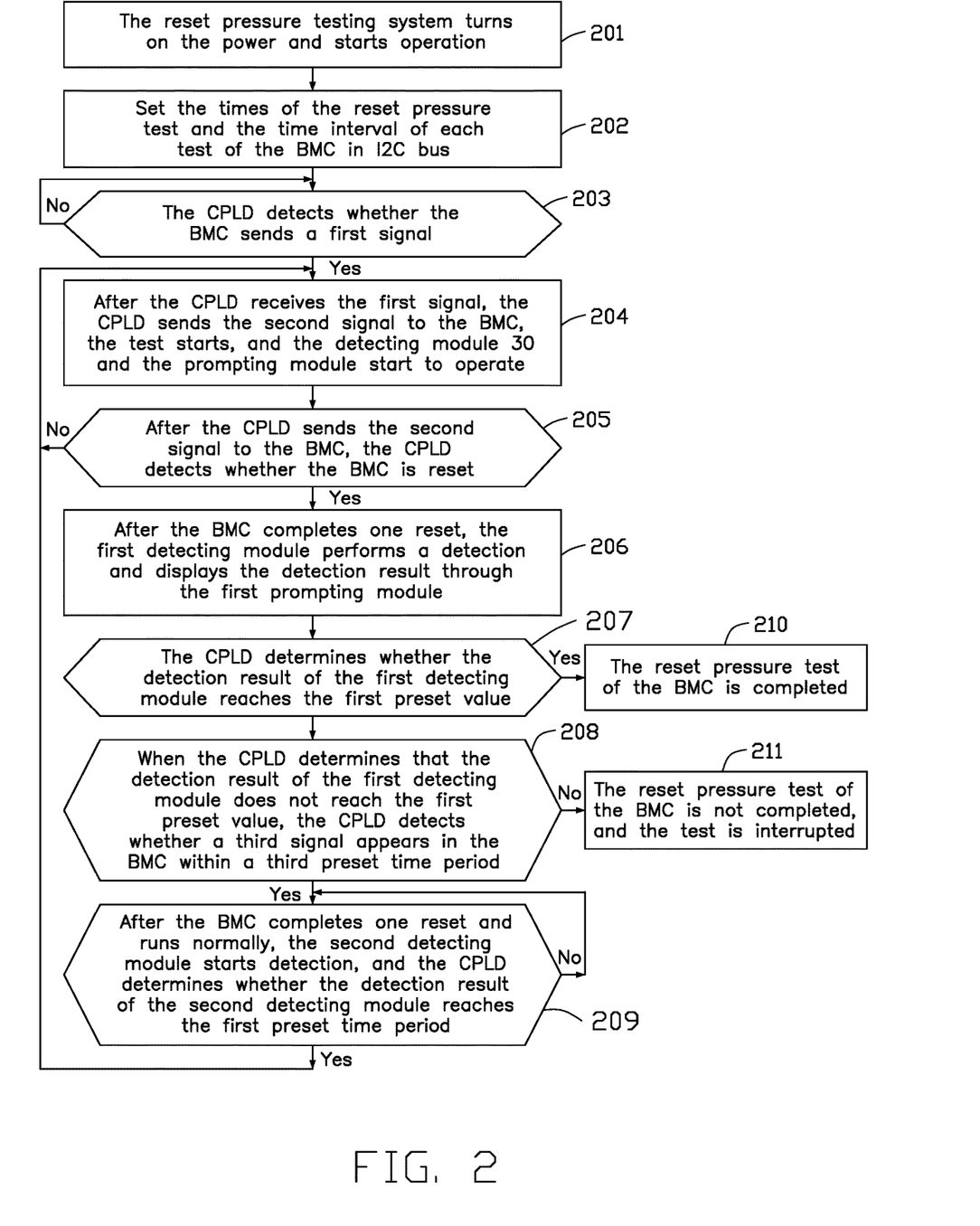
FIG. 2 is a flowchart of a method for testing reset pressure in relation to baseboard management controller according to an embodiment of the present disclosure.

FIG. 2 is a flowchart depicting an embodiment of a method for testing reset pressure of a baseboard management controller. The method for testing reset pressure may be applied to the CPLD.

Each block shown in FIG. 2 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 21.

At block 201, the reset pressure testing system 100 turns on the power and starts operation.

At block 202, the number of times for setting the reset pressure test and the time interval of each test of the BMC 20 in I2C bus is input.

In the embodiment, during the reset pressure test of the BMC 20, taking the number of times of resetting the BMC 20 as a first preset value and the interval between each reset of the BMC 20 as a first preset time period as an example, the method for testing reset pressure of the BMC 20 is as follows.

At block 203, the CPLD 10 detects whether the BMC 20 sends a first signal S. If the BMC 20 sends a first signal S, block 204 is implemented, otherwise method returns to block 203.

Until the BMC 20 sends the first signal S to the CPLD 10, the test does not begin, and block 203 continues.

When the BMC 20 sends the first signal S to the CPLD 10 through the I2C bus, the CPLD 10 receives the first signal S and sends the second signal R to the BMC 20, the reset pressure test of the BMC 20 starts, and then block 204 is executed.

At block 204, after the CPLD 10 receives the first signal S, the CPLD 10 sends the second signal R to the BMC 20, the test starts, and the timing module 12, the counting module 13 and the prompting module 40 start to operate.

At block 205, after the CPLD 10 sends the second signal R to the BMC 20, the CPLD 10 detects whether the BMC 20 is reset. If the BMC 20 is reset, block 206 is implemented, otherwise method returns to block 204.

In the embodiment, the present disclosure controls the BMC 20 to send the first prompt signal after reset by setting relevant program codes. The first prompt signal can be low pulse signal. When the BMC 20 continuously sends the first prompt signal for a second preset time period, then the BMC 20 is reset successfully.

After the CPLD 10 sends the second signal to the BMC 20, if the CPLD 10 detects the first prompt signal of the BMC 20 and determines that the time for the BMC 20 to continuously send the first prompt signal is at least equal to the second preset time period, the BMC 20 has completed one reset, and then block 206 is executed.

After the CPLD 10 sends the second signal R to the BMC 20, if the CPLD 10 does not detect that the BMC 20 sends the first prompt signal, or if a first prompt signal is sent but the BMC 20 does not send the first prompt signal for the second preset time period, then the BMC 20 does not complete the reset, the reset fails, and then block 204 is executed.

In some embodiments, the timing module 12 detects the time when the BMC 20 sends the first prompt signal, the CPLD 10 determines whether the BMC 20 continues to send the first prompt signal for the second preset time period according to the detection result of the timing module 12.

In some embodiments, when the BMC 20 continuously sends the first prompt signal for the second preset time period, the BMC 20 returns to the initial state, and the detection time of the timing module 12 is zero.

At block 206, after the BMC 20 completes one reset, the the counting module 13 performs a detection and display the detection result through the first prompting module 41.

At block 207, the CPLD 10 determines whether the detection result of the counting module 13 reaches the first preset value. If the detection result of the counting module 13 reaches the first preset value, block 210 is implemented, otherwise block 208 is implemented.

After the BMC 20 completes one reset, if the CPLD 10 determines that the detection result of the counting module 13 does not reach the first preset value, the reset times of the BMC 20 do not reach the first preset value, and the reset pressure test of the BMC 20 is not completed, and block 208 is executed.

After the BMC 20 completes one reset, if the CPLD 10 determines that the detection result of the counting module 13 reaches the first preset value, the reset times of the BMC 20 reaches the first preset value, and the reset pressure test of the BMC 20 is completed, and block 210 is executed.

At block 208, when the CPLD 10 determines that the detection result of the counting module 13 does not reach the first preset value, the CPLD 10 detects whether a third signal W appears in the BMC 20 within a third preset time period. If the third signal W appears in the BMC 20 within the third preset time period, block 209 is implemented, otherwise block 211 is implemented.

When the CPLD 10 detects that the third signal appears in the BMC 20 within the third preset time period, the BMC 20 completes one reset and operates normally, and then block 209 is executed.

When the CPLD 10 detects that the third signal does not appear in the BMC 20 within the third preset time period, the BMC 20 is not operating normally, the test is interrupted, and then S211 is executed.

At block 209, after the BMC 20 completes one reset and runs normally, the timing module 12 starts detection, and the CPLD 10 determines whether the detection result of the timing module 12 reaches the first preset time period. If the detection result of the timing module 12 reaches the first preset time period, method returns to block 204, otherwise method returns to block 209.

When the CPLD 10 determines that the detection result of the timing module 12 reaches the first preset time period, method returns to block 204.

When the CPLD 10 determines that the detection result of the timing module 12 does not reach the first preset time period, method returns to block 209.

At block 210, the reset pressure test of the BMC 20 is completed.

At block 211, the reset pressure test of the BMC 20 is not completed, and the test is interrupted.

Figure 3:
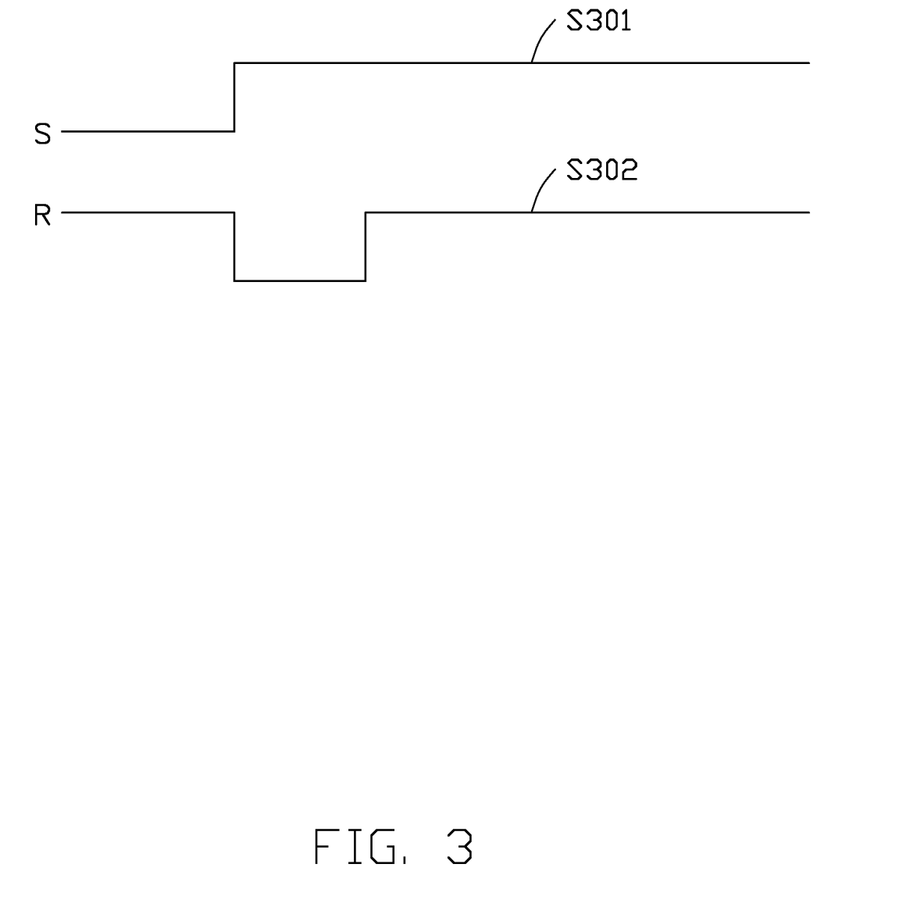
FIG. 3 is a waveform diagram at the beginning of reset pressure test according to an embodiment of the present disclosure.

FIG. 3 is a waveform diagram at the beginning of the reset pressure test of the BMC 20.

S301 is the waveform of the first signal S when the reset pressure test of the BMC 20 starts. S302 is the waveform of the second signal R when the reset pressure test of the BMC 20 starts. As shown in FIG. 3, when the first signal S is transmitted to CPLD 10, the CPLD 10 sends the second signal R. In the embodiment, the low level indicates the transmission of the signal.

Figure 4:
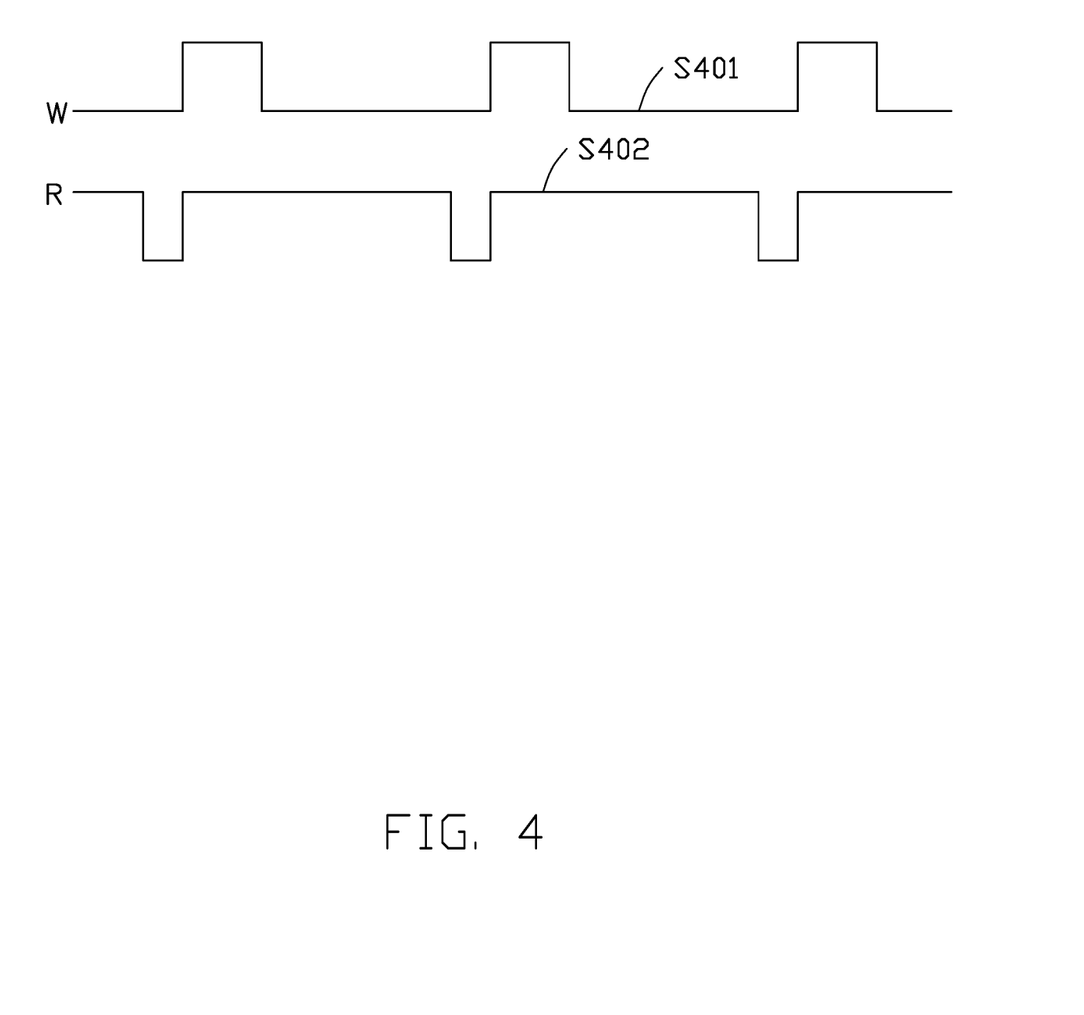
FIG. 4 is a waveform diagram when the reset pressure testing of the BMC of the embodiment of the present disclosure is normal.

FIG. 4 is a waveform diagram when the reset pressure test of the BMC 20 is normal.

S401 is the waveform of the third signal W when the reset pressure test of the BMC 20 is normal. As shown in FIG. 4, when the reset pressure test of the BMC 20 is normal, the third signal W appears at a fixed frequency, and the BMC 20 operates normally.

S402 is the waveform of the second signal R when the reset pressure test of the BMC 20 is normal. As shown in FIG. 4, when the reset pressure test of the BMC 20 is normal, the second signal R is sent out at a fixed frequency.

Figure 5:
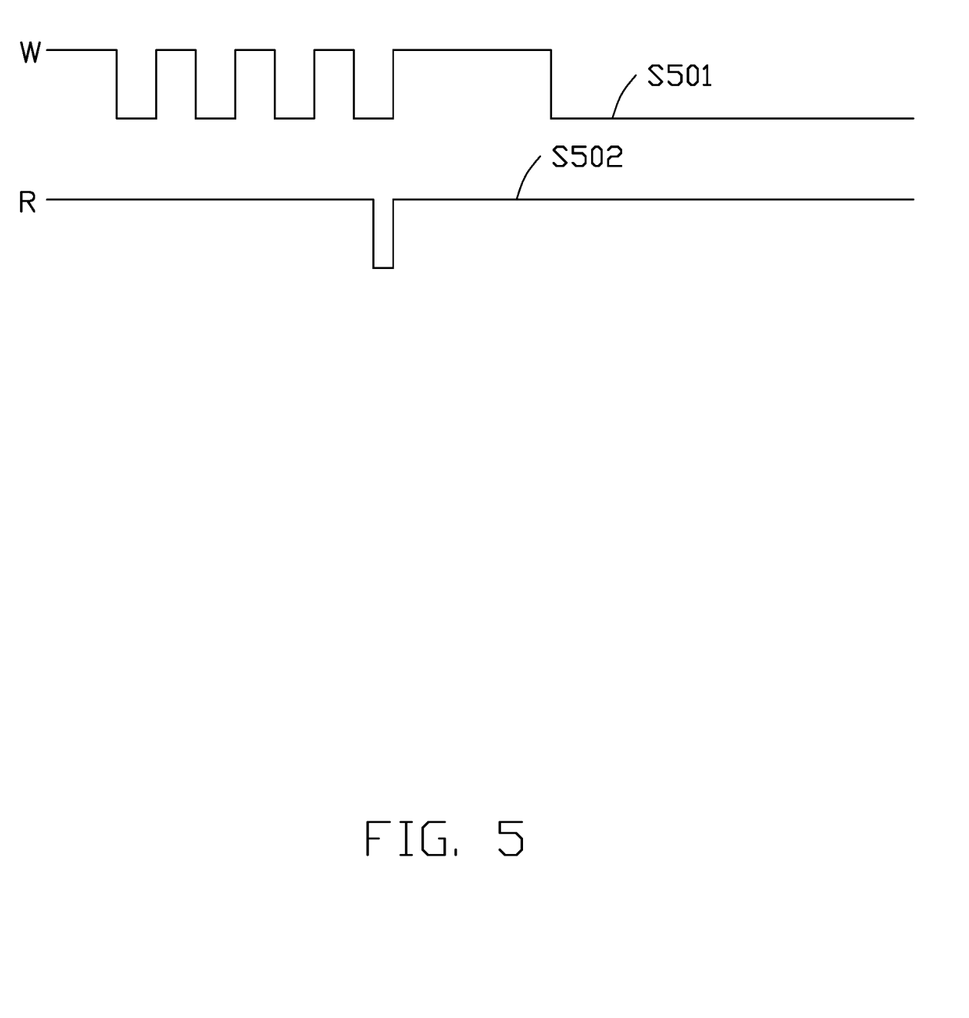
FIG. 5 is a waveform diagram when the reset pressure testing of the BMC of the embodiment of the present disclosure is interrupted.

FIG. 5 is a waveform diagram when the reset pressure test of the BMC 20 is interrupted.

S501 is the waveform of the third signal W when the reset pressure test of the BMC 20 is not complete. As shown in FIG. 5, when the reset pressure test of the BMC 20 is not completed, the third signal W stops sending at a fixed frequency and does not recover, and the BMC 20 is not operating normally.

S502 is the waveform of the second signal R when the reset pressure test of the BMC 20 is not complete. As shown in FIG. 5, when the BMC 20 is not working normally, the CPLD 10 stops sending the second signal R.

The integrated unit realized in the form of software function module can be stored in a computer-readable storage medium. The above software function module is stored in a storage medium and includes several instructions to enable a computer device (which can be a personal computer, terminal, network device) or processor to execute part of the method described in each embodiment of the present disclosure.

The program code is stored in the CPLD 10, and the CPLD 10 can call up the program code to perform related functions.

In one embodiment of the present disclosure, the CPLD 10 stores a plurality of instructions, which are executed by the CPLD 10 to realize the method for testing reset pressure of the BMC. The specific implementation method of the above instructions by the CPLD 10 can refer to the description of relevant steps in the corresponding embodiment of FIG. 2, which will not be repeated here.

The present disclosure realizes all or part of the process in the above embodiment method and can also be completed by instructing relevant hardware through computer program. The computer program can be stored in a computer-readable storage medium, and the computer program can realize the steps of the above method embodiments when executed by the processor. The computer program includes computer program code, which can be in the form of source code, object code, executable file or some intermediate forms. The computer-readable medium may include any entity or device capable of carrying the computer program code, recording medium, U disk, mobile hard disk, magnetic disk, optical disk, computer memory, read only memory (ROM), random access memory (RAM).

The method for testing reset pressure of the BMC proposed in the present disclosure adopts the preset program to test, so as to unify the test standard and avoid the interference of various external factors in the test process. The method also sets the pressure testing module 11 in the CPLD 10, which consumes less logic unit resources and runs automatically and continuously, reducing the consumption of human resources. The method also sets the prompting module 40 to display the reset times and test status of the BMC 20, which is convenient for the staff to observe the test process and test results.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A reset pressure testing method of a baseboard management controller (BMC) applicable to a complex programmable logic device (CPLD), comprising:
   receiving a first signal from the BMC;
   sending a second signal to the BMC to reset the BMC by the CPLD when the CPLD receives the first signal;
   detecting whether a third signal appears in the BMC by the CPLD when the BMC is reset,
   wherein when the CPLD detects that the third signal appears in the BMC, the BMC completes the reset and operates normally; and when the CPLD does not detect the third signal in the BMC, the CPLD interrupts the reset pressure testing of the BMC; and
   setting a number of times the BMC is reset and the time interval of each reset of the BMC, wherein the number of times the BMC is reset is a first preset value, and the time interval of each reset of the BMC is a first preset time period.

2. The reset pressure testing method of claim 1, further comprising:
   detecting whether the BMC is reset when the CPLD sends the second signal to the BMC;
   wherein when the CPLD detects that the BMC sends a first prompt signal, and the BMC continues to send the first prompt signal for a second preset time period, the BMC completes one reset,
   when the CPLD detects that the BMC sends the first prompt signal, the BMC does not continuously send the first prompt signal for the second preset time period, the BMC does not complete the reset; and when the CPLD does not detect that the BMC sends the first prompt signal, the BMC does not complete the reset.

3. The reset pressure testing method of claim 1, further comprising:
   determining whether a number of times of the reset pressure test of the BMC reaches the first preset value by the CPLD when the BMC completes a reset,
   wherein when the CPLD determines that the number of times of the reset pressure tests of the BMC does not reach the first preset value, the reset pressure test BMC is not completed; and
   when the CPLD determines that the number of times of the reset pressure tests of the BMC reaches the first preset value, the reset pressure test of the BMC is completed.

4. The reset pressure testing method of claim 3, wherein when the CPLD determines that the number of times of the reset pressure tests of the BMC does not reach the first preset value, the CPLD determines whether the BMC appears a third signal within a third preset time period; wherein when the CPLD determines that the BMC has the third signal within the third preset time period, the BMC completes a reset and operates normally; and wherein when the CPLD determines that the BMC does not appear the third signal within the third preset time period, the BMC does not operate normally, and the reset pressure test of the BMC is interrupted.

5. The reset pressure testing method of claim 1, wherein after the BMC completes a reset and operates normally, the CPLD determines whether operation time of the BMC after completing a reset reaches the first preset time period; when the CPLD determines that running time after the BMC completes a reset reaches the first preset time period, the CPLD sends the second signal to the BMC again; when the running time after the BMC completes a reset does not reach the first preset time period, the CPLD continues to detect.

6. A reset pressure testing system comprising:
a baseboard management controller (BMC) configured to send a first signal;
a complex programmable logic device (CPLD) configured to receive the first signal, send a second signal to the BMC to reset the BMC, and detect whether a third signal appears in the BMC when the BMC is reset,
wherein when the CPLD detects that the third signal appears in the BMC, the BMC completes the reset and operates normally; and when the CPLD does not detect the third signal in the BMC, the CPLD interrupts the reset pressure testing of the BMC; and
the CPLD further sets a number of times the BMC is reset and the time interval of each reset of the BMC, wherein the number of times the BMC is reset is a first preset value, and the time interval of each reset of the BMC is a first preset time period.

7. The reset pressure testing system of claim 6, wherein the CPLD comprises a timing module and a counting module, the timing module is configured to detect the time for processing the reset pressure test of the BMC, the counting module is configured to detect a number of resets of the BMC during the reset pressure test of the BMC.

8. The reset pressure testing system of claim 7, wherein the reset pressure testing system further comprises a first prompting module and a second prompting module, the first prompting module is configured to display the number of the resets of the BMC during the reset pressure test of the BMC, the second prompting module is configured to display a state of the reset pressure test of the BMC.

9. The reset pressure testing system of claim 6, wherein the CPLD detects whether the BMC is reset when the CPLD sends the second signal to the BMC; when the CPLD detects that the BMC sends a first prompt signal, and the BMC continues to send the first prompt signal for a second preset time period, the BMC completes one reset. when the CPLD detects that the BMC sends the first prompt signal, the BMC does not continuously send the first prompt signal for the second preset time period, the BMC does not complete the reset; and when the CPLD does not detect that the BMC sends the first prompt signal, the BMC does not complete the reset.

10. The reset pressure testing system of claim 6, wherein the CPLD determines whether a number of times of the reset pressure test of the BMC reaches the first preset value when the BMC completes a reset; wherein when the CPLD determines that the number of times of the reset pressure tests of the BMC does not reach the first preset value, the reset pressure test BMC is not completed; and when the CPLD determines that the number of times of the reset pressure tests of the BMC reaches the first preset value, the reset pressure test of the BMC is completed.

11. The reset pressure testing system of claim 10, wherein when the CPLD determines that the number of times of the reset pressure tests of the BMC does not reach the first preset value, the CPLD determines whether the BMC appears a third signal within a third preset time period; wherein when the CPLD determines that the BMC has the third signal within the third preset time period, the BMC completes a reset and operates normally; and wherein when the CPLD determines that the BMC does not appear the third signal within the third preset time period, the BMC does not operate normally, and the reset pressure test of the BMC is interrupted.

12. The reset pressure testing system of claim 6, wherein after the BMC completes a reset and operates normally, the CPLD determines whether operation time of the BMC after completing a reset reaches the first preset time period; when the CPLD determines that running time after the BMC completes a reset reaches the first preset time period, the CPLD sends the second signal to the BMC again; when the running time after the BMC completes a reset does not reach the first preset time period, the CPLD continues to detect.

13. A non-transitory storage medium having stored thereon instructions that, when executed by a complex programmable logic device (CPLD) of a reset pressure testing system, causes the CPLD to execute instructions of a reset pressure testing method, the method comprising:
receiving a first signal from a baseboard management controller (BMC);
sending a second signal to the BMC to reset the BMC by the CPLD when the CPLD receives the first signal;
detecting whether a third signal appears in the BMC by the CPLD when the BMC is reset,
wherein when the CPLD detects that the third signal appears in the BMC, the BMC completes the reset and operates normally; and when the CPLD does not detect the third signal in the BMC, the CPLD interrupts the reset pressure testing of the BMC; and
setting a number of times the BMC is reset and the time interval of each reset of the BMC, wherein the number of times the BMC is reset is a first preset value, and the time interval of each reset of the BMC is a first preset time period.

14. The non-transitory storage medium of claim 13, further comprising:
detecting whether the BMC is reset when the second signal is sent to the BMC;
wherein when the CPLD detects that the BMC sends a first prompt signal, and the BMC continues to send the first prompt signal for a second preset time period, the BMC completes one reset,
when the CPLD detects that the BMC sends the first prompt signal, the BMC does not continuously send the first prompt signal for the second preset time period, the BMC does not complete the reset; and when the CPLD does not detect that the BMC sends the first prompt signal, the BMC does not complete the reset.

15. The non-transitory storage medium of claim 13, further comprising:
determining whether a number of times of the reset pressure test of the BMC reaches the first preset value by the CPLD when the BMC completes a reset;
wherein when the CPLD determines that the number of times of the reset pressure tests of the BMC does not reach the first preset value, the reset pressure test BMC is not completed; and
when the CPLD determines that the number of times of the reset pressure tests of the BMC reaches the first preset value, the reset pressure test of the BMC is completed.

16. The non-transitory storage medium of claim 15, wherein when the CPLD determines that the number of times of the reset pressure tests of the BMC does not reach the first preset value, the CPLD determines whether the BMC appears a third signal within a third preset time period; wherein when the CPLD determines that the BMC has the third signal within the third preset time period, the BMC completes a reset and operates normally; and wherein when the CPLD determines that the BMC does not appear the third signal within the third preset time period, the BMC does not operate normally, and the reset pressure test of the BMC is interrupted.

17. The non-transitory storage medium of claim 13, wherein after the BMC completes a reset and operates normally, the CPLD determines whether operation time of the BMC after completing a reset reaches the first preset time period; when the CPLD determines that running time after the BMC completes a reset reaches the first preset time period, the CPLD sends the second signal to the BMC again; when the running time after the BMC completes a reset does not reach the first preset time period, the CPLD continues to detect.

* * * * *